July 7, 1959 F. S. PERDUE 2,893,066
SECTIONAL TRAILER HOUSE
Filed Aug. 13, 1956 2 Sheets-Sheet 1
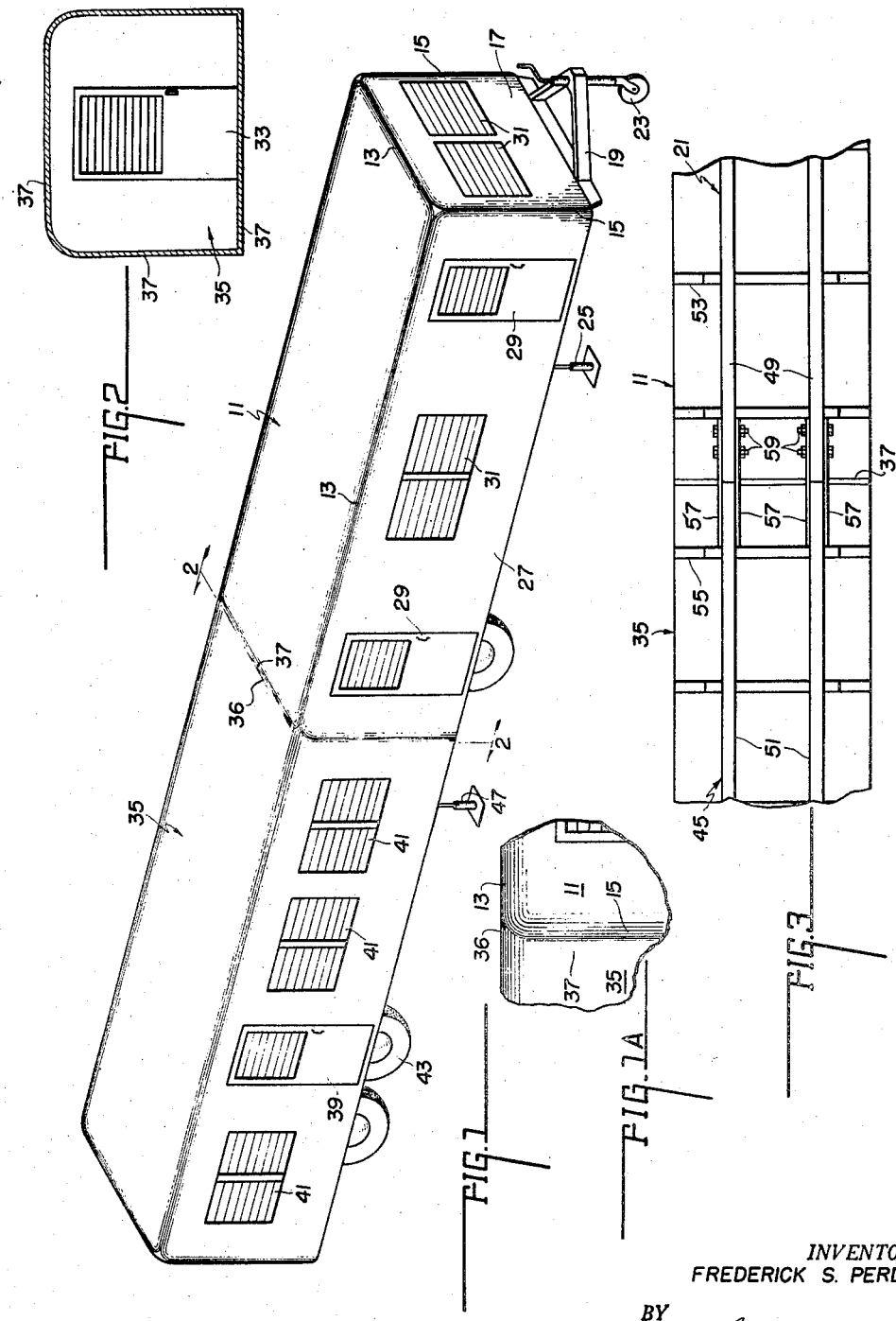
INVENTOR.
FREDERICK S. PERDUE
BY
ATTORNEY July 7, 1959 F. S. PERDUE 2,893,066
SECTIONAL TRAILER HOUSE
Filed Aug. 13, 1956 2 Sheets-Sheet 2
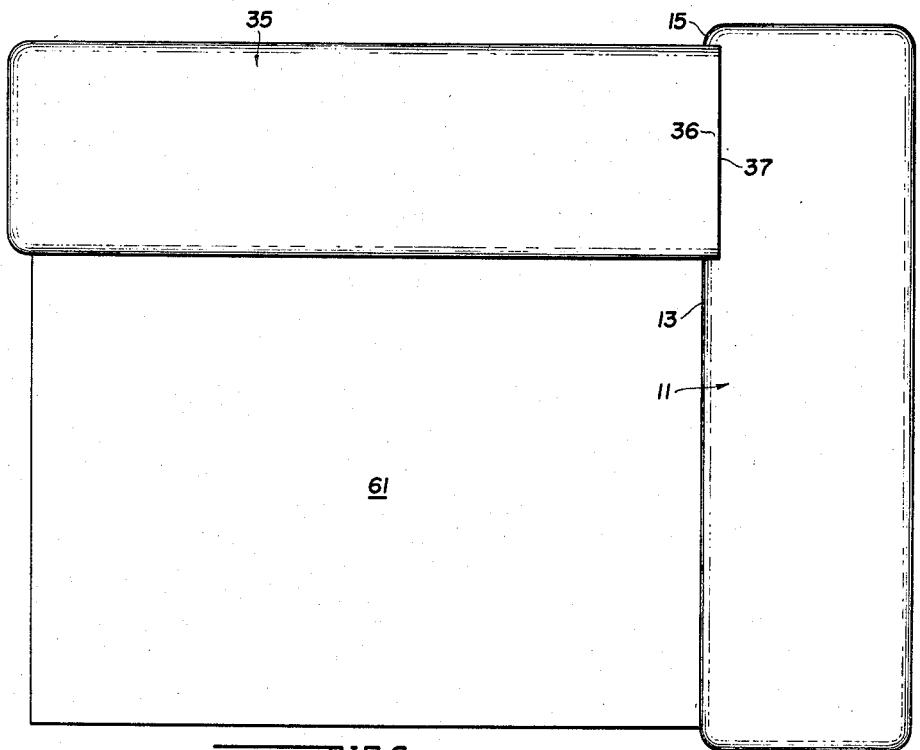
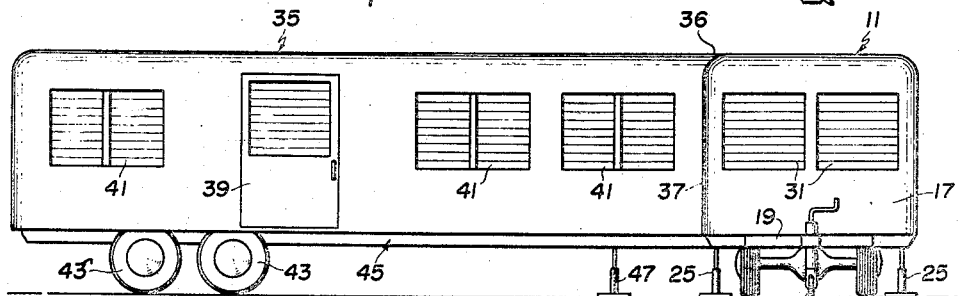
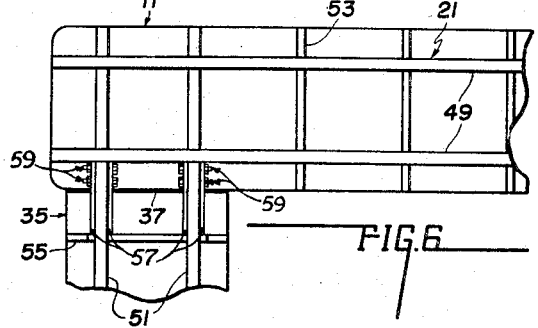
INVENTOR.
FREDERICK S. PERDUE
BY
*Albert L. Jeffers*
ATTORNEY

United States Patent Office 2,893,066
Patented July 7, 1959

2,893,066

SECTIONAL TRAILER HOUSE

Frederick S. Perdue, Fort Wayne, Ind.

Application August 13, 1956, Serial No. 603,503

8 Claims. (Cl. 20—2)

This invention relates to a sectional house trailer. More particularly it relates to a trailer of the type described in which each section is an individual unit which is capable of use independent of the other but which may be combined with the other unit to form a unitary structure.

It is a well-known fact that present-day house trailers have reached the dimensional limitations for road vehicles, and if their size is increased, they will be denied the use of the highways.

In an effort to provide more space, within such limitations, trailer manufacturers have resorted to the addition of an upper floor. The height dimension is also limited, however, since road and railway underpasses must be cleared. Such "double deck" construction is also expensive, tends to produce "top heaviness" which makes such a trailer difficult to tow and renders the vehicle less safe.

Further, such a trailer constitutes an undue load for the ordinary passenger car to tow.

It is, therefore, an object of the invention to provide a trailer construction which will provide ample living space as a stationary home but which can also be separated so that a portion of the structure can be used as a road trailer when the owner desires to travel.

It is another object of the invention to provide a stationary home which exceeds the dimensional limitations applying to road vehicles but which may be separated into a number of units for transportation, each unit of which will be within said dimensional limits.

A further object of the invention is to provide individual trailer units which may be assembled into a single, weather-proof structure, each of said units being of a size which will enable it to be conveniently towed by an ordinary passenger car.

It is another object of the invention to provide separate trailer units which can be assembled into a number of ways to provide different floor plans for the stationary home.

It is yet another object of the invention to provide a large living space without resorting to expensive trailer construction.

These and other objects will become apparent from a study of this specification and the drawings which are attached hereto, made a part hereof and in which:

Figure 1 is a perspective view of the two trailers assembled, end to end, to form a stationary home.

Figure 1A is a detailed view showing the sealing means of the two trailers illustrated in Figure 1.

Figure 2 is a sectional view taken substantially on the line 2—2 of Figure 1 showing the seal and end door.

Figure 3 is a bottom view of Figure 1 showing the means for joining the two units.

Figure 4 is a plan view showing another arrangement of the units.

Figure 5 is an elevational view of the structure of Figure 4.

Figure 6 is a bottom view of a structure similar to Figure 3 but with one unit attached near the opposite end of the other unit showing the means for joining the two units.

*Preferred form.*—(Figures 1 to 3)

Referring first to Figure 1, the trailer unit 11, hereinafter referred to as the front or first unit, is substantially in the shape of a rectangular parallelepiped except that all of the top and vertical edges 13 and 15 are rounded or convex in form.

The front end 17 of unit 11 is provided with the usual angle frame 19 which is rigidly attached to frame structure 21 of the unit and is provided with the caster 23. In addition, suitable jacks 25 may be provided to level and support the structure.

The unit is provided with the usual shell structure 27 which is mounted on the frame 21.

Doors 29 and windows 31 are provided wherever required.

Unit 11 is an independent, separately portable trailer and is provided with a door (not shown) in its rear end wall the frame of which aligns with the frame of the door 33 (Figure 2) in the front end of the second or rear unit 35. The doors just mentioned open inwardly of their respective units, and when the units are joined, one of the doors may be removed.

The rear unit 35 is of generally the same form as the front unit with the exception that its front end, instead of having a rounded top corner has a concaved top corner 36 so that it will receive and fit over the corresponding convex corner of the front unit.

A suitable sealing means 37 of rubber or other yieldable material is fixed to all of the front end corners of the unit 35 so that it will sealingly engage the rear end of unit 11 and prevent the entrance of rain, dust, etc., between the ends of the units.

The rear unit is provided with suitable doors 39 and windows 41 and with the usual wheel structure 43 suitably attached to its frame 45. The required removable jacks 47 may also be provided to level and support the rear unit when it is stationary.

As shown in Figure 3, the frames 21 and 45 comprise longitudinal members 49 and 51 respectively which support cross members 53 and 55 respectively, the latter being disposed above the longitudinals.

To join the two units when they occupy the endwise abutting relation shown in Figures 1 and 3, the plates 57 are disposed on opposite sides of the longitudinal members so as to overlap the ends thereof, and suitable bolts 59 are passed through the members and plates and drawn down to hold the members in proper alignment.

*Modified form.*—(Figures 4 to 6)

Referring now to Figures 4 to 6 inclusive, it will be seen that by reason of the form of the front end of the unit 35, the two units may be assembled into an L-shaped structure as shown in Figure 4. This arrangement makes it possible to partially enclose a space 61 which may serve as a patio which may be provided with flagstones or with a flower garden, etc., to make the home more attractive and interesting.

It is to be noted that, as shown particularly in Figures 4 and 6, the unit 35 joins the unit 11 beyond the rear end of the latter so that the rounded corner 15 is cleared. This permits the seal member 37 to engage the flat sidewall of unit 11 and insures a proper seal.

It will be noted also, that the door 33 of the rear unit must be aligned with the rear side door 29 of the front unit to permit passage from the interior of one unit to the other.

From Figure 6 it will be seen that the longitudinal members 51 of the rear unit abut the side of one of the longitudinal members 49 of the front unit and plates 57 are disposed on opposite sides of the longitudinal members so as to overlap the ends of the cross members 53, and suitable bolts 59 are passed through the cross members and plates and drawn down to hold the members in proper alignment.

The units are thus rigidly connected to maintain the floors of the units at the same level and to insure that the seal afforded by the member 37 is maintained effective.

When it is desired to travel with one of the units, the connecting bolts 59 or 65 and the associated plates or angles are removed, the jacks are removed from the unit to be used, the door in the end is replaced and the front unit is ready for transport.

In the event it is desired to use the rear unit instead of the front unit, the A-frame 19 may be removed from the front unit and installed on the rear unit or a separate A-frame may be used.

In case it is necessary to move both units, separate automobiles may be used or the entire structure can be moved by making two trips.

It should also be noted that the rear unit can be aligned with front, side door of the first unit as shown in Figure 6 if this is desirable or convenient.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

I claim:

1. A mobile sectional trailer house comprising at least two self-contained trailer units, the end wall of one of said units being concave in shape so as to fit the convex exterior contour of the entire portion of the other unit and sealing means mounted on the end of said one unit in position to sealingly engage the exterior of the other unit.

2. The structure defined by claim 1 wherein each unit includes a bottom frame comprising a number of longitudinal members and connecting means are provided for fastening the members of the two units together to form an integral structure.

3. A mobile sectional trailer house comprising at least two self-contained trailer units adapted to be transported by an automobile on a conventional highway, each having a bottom frame, the end wall of one of said units having substantially the same cross-sectional shape as a side wall thereof, one end wall of the other unit having a cross-sectional shape which conforms with and is adapted to fit the exterior of either of the first mentioned walls and means for connecting said bottom frames together to hold the units in assembled relation so that they form an integral structure.

4. The structure defined by claim 3, said one end having a seal adapted to engage said one unit and wherein said one end wall defines a doorway and wherein said one unit defines a number of doorways in said end and side walls, with any of which doorways said first mentioned doorway may be aligned by selective assembly of the units according to any one of a number of floor plans.

5. The structure defined by claim 1 wherein the wall of the seal bearing end of said one unit defines a doorway and wherein one side of said other unit defines a doorway, said doorways being positioned so that they will be aligned when said units are positioned with their lengths at right angles to each other.

6. The structure defined by claim 1 wherein the wall of the seal bearing end of said one unit defines a doorway and wherein at least one side and other end of said one unit defines a doorway, said doorway being positioned so as to be aligned selectively when said units are positioned whereby said units may be selectively positioned to form a house in either of two floor plans.

7. The structure defined by claim 1 wherein said sealing means extends entirely around the periphery of the end of said one unit so as to seal the joint between the two units entirely.

8. The structure defined by claim 3 wherein the vertical corners of said one unit are curved about a vertical axis and which includes sealing means mounted on the fitting end of said other unit for sealing engagement with the sidewall of said one unit, means for connecting said units with seal bearing end of said other unit abutting a sidewall of said one unit, said other unit being spaced from the end of said one unit a distance at least sufficient to clear the curved surface forming the adjacent corner of the one unit to insure complete engagement between said sealing means and said one unit.

References Cited in the file of this patent

UNITED STATES PATENTS

| 2,154,142 | Whelan | Apr. 11, 1939 |
| 2,247,340 | Webster | June 24, 1941 |

FOREIGN PATENTS

| 186,809 | Great Britain | Oct. 12, 1922 |
| 833,658 | France | July 25, 1938 |
| 597,294 | Great Britain | June 22, 1948 |

OTHER REFERENCES

Architectural Record, page 89, May 1939.